United States Patent [19]
Sakurai

[11] Patent Number: 5,971,149
[45] Date of Patent: Oct. 26, 1999

[54] CASES FOR ACCOMMODATING TAPE CASSETTES

[75] Inventor: Satoshi Sakurai, Miyagi, Japan

[73] Assignee: Sony Corporation, Japan

[21] Appl. No.: 09/037,683

[22] Filed: Mar. 10, 1998

[30] Foreign Application Priority Data

Mar. 10, 1997 [JP] Japan .................................. 9-054363

[51] Int. Cl.[6] ................................................ B65D 85/672
[52] U.S. Cl. ...................................... 206/387.13; 206/493
[58] Field of Search ................................ 206/307, 387.1, 206/387.12, 387.13, 493

[56] References Cited

U.S. PATENT DOCUMENTS

| | | | |
|---|---|---|---|
| 3,587,841 | 6/1971 | Devejian | 206/387.1 |
| 4,054,206 | 10/1977 | Kobayashi et al. | 206/387.1 |
| 4,235,334 | 11/1980 | Ahn | 206/387.1 |
| 4,347,933 | 9/1982 | Ishida et al | 206/387.1 |
| 5,097,952 | 3/1992 | Katagiri et al. | 206/387.1 |
| 5,445,268 | 8/1995 | Suzuki | 206/387.1 |

*Primary Examiner*—Jim Foster
*Attorney, Agent, or Firm*—Ronald P. Kananen; Rader, Fishman & Grauer

[57] ABSTRACT

A case for accommodating a tape cassette includes a cassette-support reference arranged with a case main body on the bottom of a cassette compartment and for supporting a shell of the tape cassette to be apart from the bottom of the cassette compartment, reel supports arranged with the case main body on the bottom of the cassette compartment and for supporting the tape reels of the tape cassette having the shell supported by the cassette-support reference to be in non-contact with the shell, and a lid arranged to close the cassette compartment of the case main body.

11 Claims, 9 Drawing Sheets

CASES FOR ACCOMMODATING TAPE CASSETTES

BACKGROUND OF THE INVENTION

The present invention relates to cases for accommodating tape cassettes.

Figure 7:
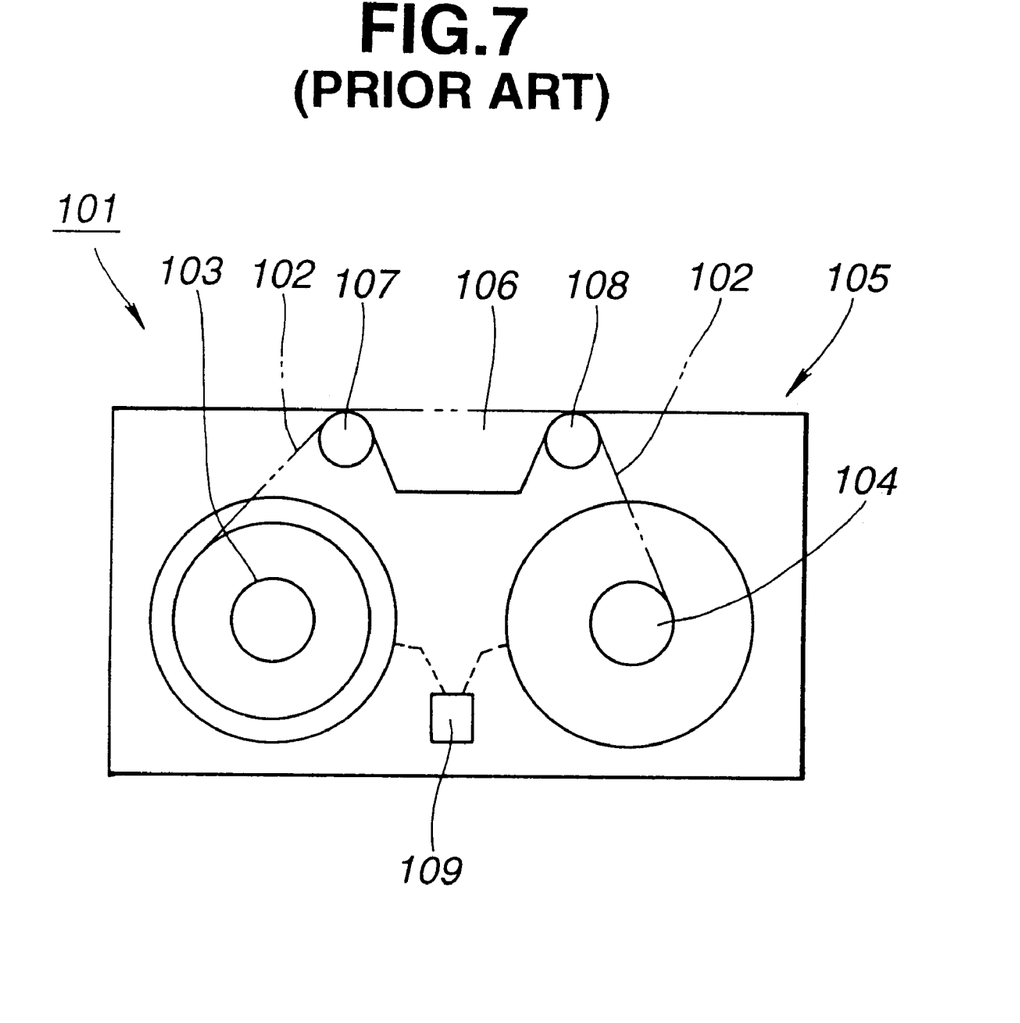
FIG. 7 is a schematic plan view showing a known tape cassette.

An example of tape cassettes is a tape cassette 101 for digital videorecorder as shown in FIG. 7. The tape cassette 101 comprises a magnetic tape 102, a pair of reels 103, 104 having the magnetic tape 102 wound thereon, a shell 105 for rotatably accommodating the tape reels 103, 104, a pair of tape guides 107, 108 for running the magnetic tape 102 withdrawn from the tape reels 103, 104 in a pocket 106 arranged in the shell 105, and a reel lock member 109 for unrotatably locking the tape reels 103, 104.

Figure 8:
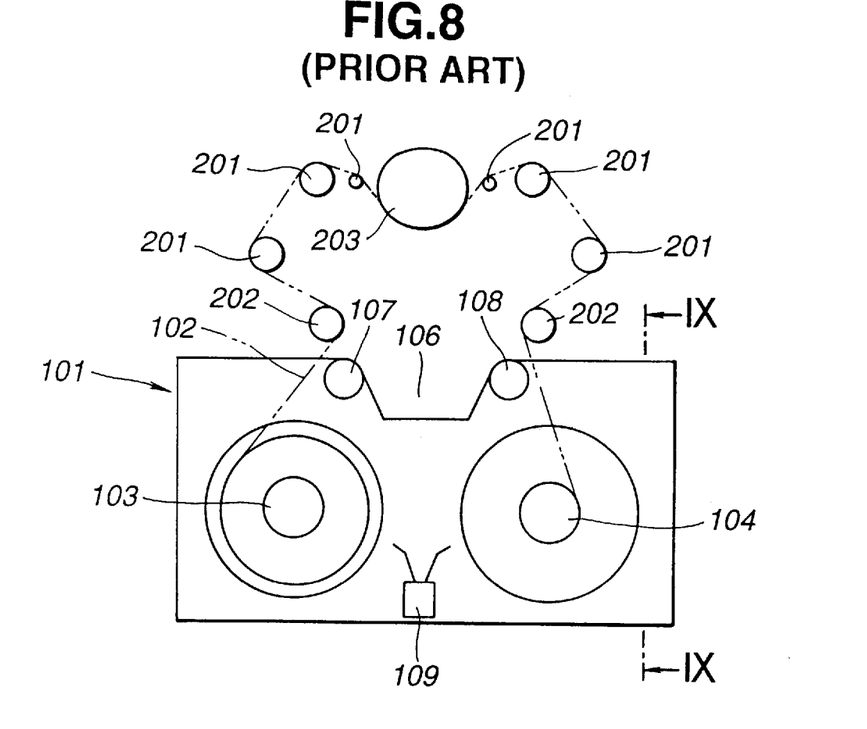
FIG. 8 is a view similar to FIG. 7, showing the known tape cassette with a magnetic tape loaded.
Figure 9:
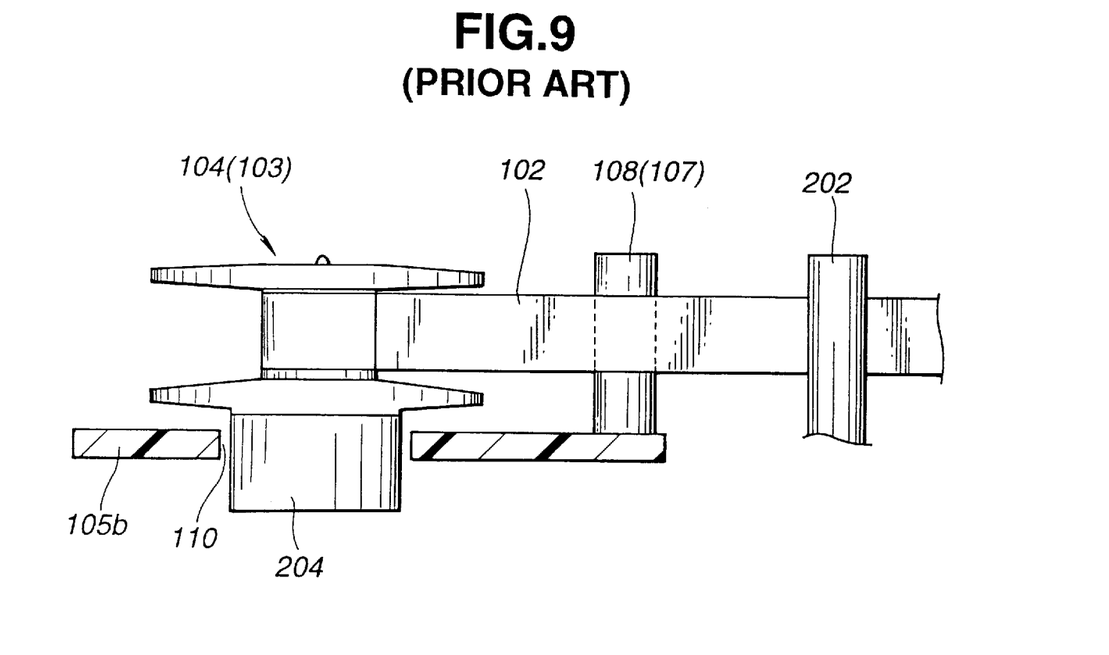
FIG. 9 is a view similar to FIG. 5, taken along the line IX—IX FIG. 8.

Referring to FIG. 8, when loading the tape cassette 101 in a videotape recorder (VTR), locking of the tape reels 103, 104 by the reel lock member 109 is released, and the magnetic tape 102 is withdrawn from the pocket 106 through movable tape guides 201 and stationary tape guides 202 of VTR and is wound on a rotary head 203 of VTR. Referring to FIG. 9, the tape reels 103, 104 are raised by a pair of reel supports 204 of VTR to be in non-contact with a lower half 105*b* of the shell 105, i.e. in the rotatable state. And the magnetic tape 102 is run by the tape reel 103, 104 to record/reproduce the magnetic tape 102 through the rotary head 203 of VTR.

Figure 10:
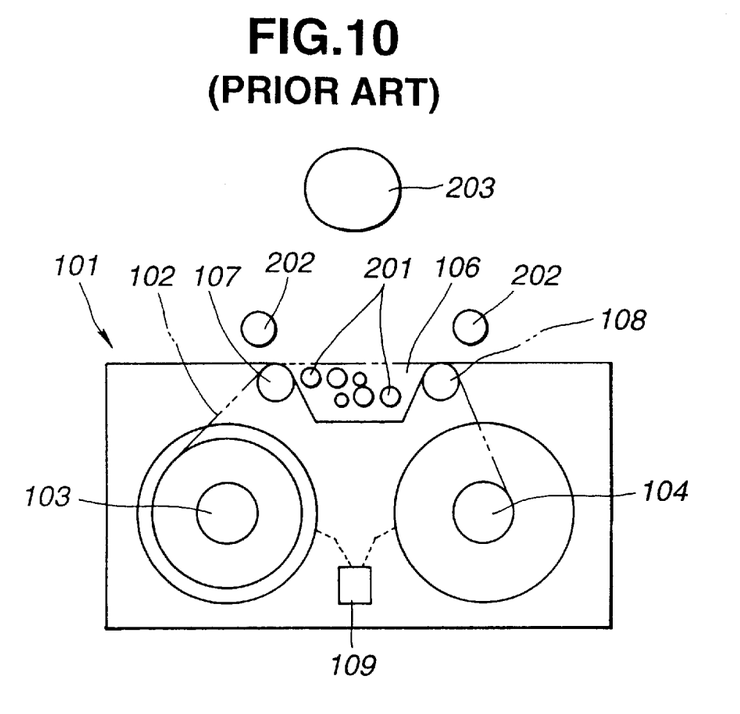
FIG. 10 is a view similar to FIG. 8, showing the known tape cassette with the magnetic tape unloaded.

Referring to FIG. 10, when unloading the magnetic tape 102 after completion of its recording/reproducing operation, the movable tape guides 201 of VTR are returned to the pocket 106 of the tape cassette 101, and the magnetic tape 102 is wound on the tape guides 107 by a predetermined angle. Then, the tape reels 103, 104 are locked by the reel lock member 109. Subsequently, referring to FIG. 11, the reel supports 204 are separated from the tape reels 103, 104 which are moved downward to have lower flanges 103*b*, 104*b* contacting the lower half 105*b* of the shell 105, closing reel-support openings 110 formed in the lower half 105*b*.

Figure 11:
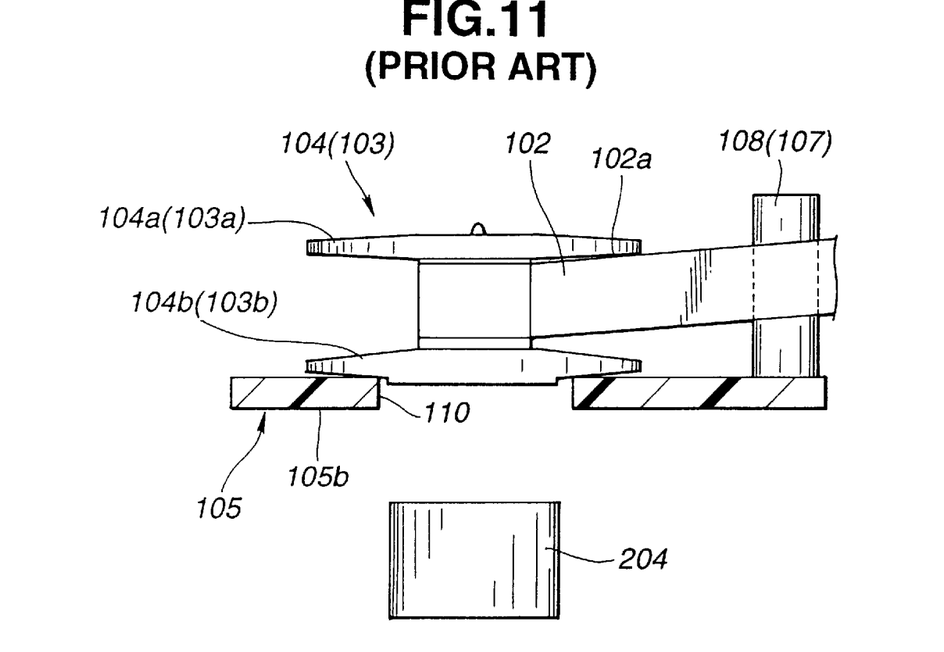
FIG. 11 is a similar to FIG. , showing the magnetic tape inclined.

When the tape reels 103, 104 are locked by the reel lock member 109 as described above, a tension is applied to the magnetic tape 102 which is thus pressed on the tape guides 107, 108. Moreover, due to a friction produced between the magnetic tape 102 and the tape guides 107, 108, the magnetic tape 102 sticks on the tape guides 107, 108. In that state, if the tape reels 103, 104 are moved downward, the magnetic tape 102 is inclined as shown in FIG. 11 to have an upper edge 102*a* pressed on upper flanges 103*a*, 104*a* of the tape reels 103, 104, suffering damage.

It is confirmed that damage of the magnetic tape 102 is not produced by applying no tension thereto when the tape reels 103, 104 are locked by the reel lock member 109. With the reel lock member 109 which applies no tension to the magnetic tape 102, however, when the magnetic tape 102 undergoes a great impact, which occurs, e.g. when dropping the tape cassette 101, it is bent greatly to disenable its normal loading in VTR, resulting in possible occurrence of a bite, etc.

If the tape cassette 101, which is accommodated in a tape-cassette case with the magnetic tape 102 inclined and with the upper edge 102*a* contacting the upper flanges 103*a*, 104*a* of the tape reels 103, 104, is kept during a long period of time in a general environment with 24° C. temperature and 45% humidity which are determined in view of an average environment in Japan, or during a short period of time in a worse environment with higher temperature and humidity, the upper edge 102*a* of the magnetic tape 102 pressed on the upper flanges 103*a*, 104*a* is deformed to cause a characteristic deterioration of the magnetic tape 102 such as off tracking or defective contact.

Figure 12:
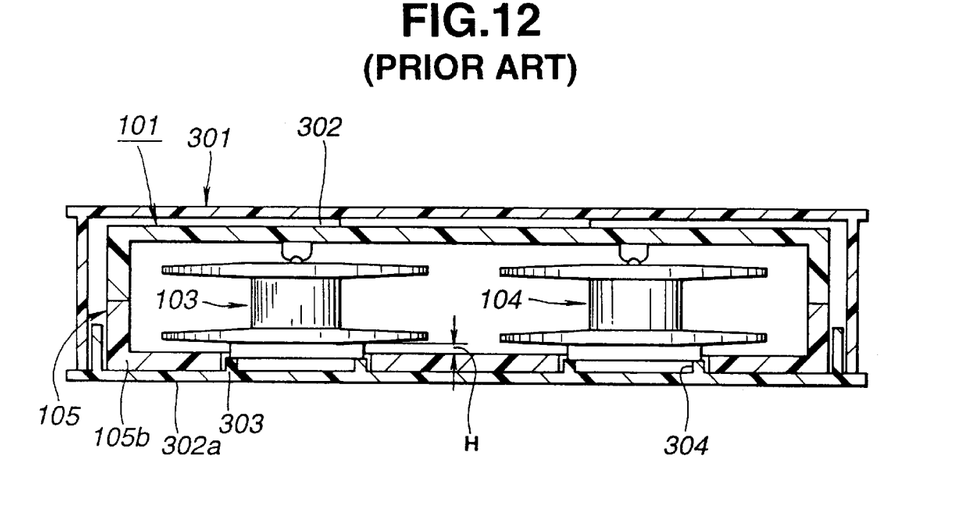
FIG. 12 is a view similar to FIG. 3, showing a known case for accommodating a tape cassette, with reel supports.

Referring to FIG. 12, a plastic tape-cassette case 301 is proposed to solve such inconvenience of the tape cassette 101. The tape-cassette case 301 includes a pair of reel supports 303, 304 on a bottom 302*a* of a cassette compartment 302. With the tape-cassette case 301, the tape cassette 101 inserted in the cassette compartment 302 has the shell 105 supported on the bottom 302*a* thereof, and the tape reels 103, 104 raised by the reel supports 303, 304 at a predetermined height H apart from the lower half 105*b* of the shell 105, preventing a deformation of the magnetic tape 102. This height H is substantially equal to the height obtained when the tape reels 103, 104 are supported by the reel supports 204 of VTR.

Figure 13:
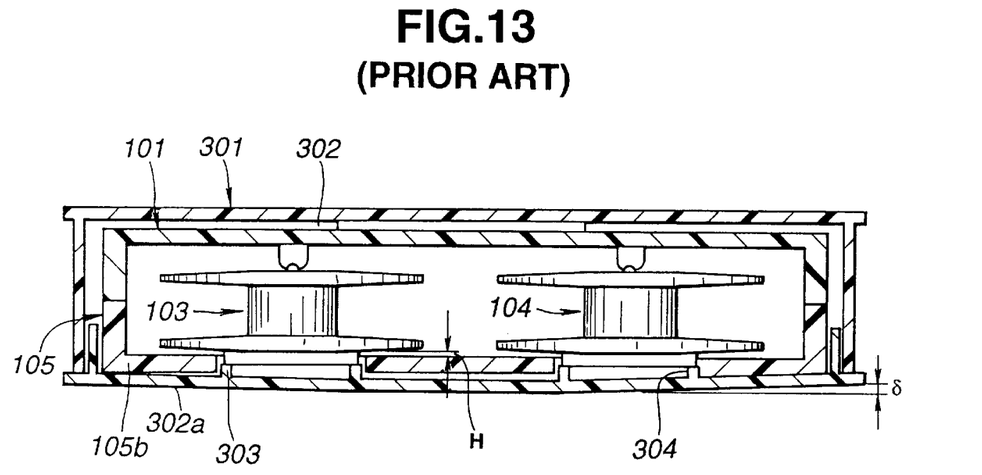
FIG. 13 is a view similar to FIG, 12, showing a problem of the known case.

With the known tape-cassette case 301, however, the lower half 105*b* of the shell 105 of the tape cassette 101 is supported by the bottom 302*a* of the cassette compartment 302, so that referring to FIG. 13, if the bottom 302*a* has a bend δ the tape reels 103, 104 cannot be raised by the reel supports 303, 304 at the predetermined height H apart from the lower half 105*b* of the shell 105. An insufficient raise of the tape reels 103, 104 results in a deformation of the magnetic tape 102.

It is, therefore, an object of the present invention to provide cases for accommodating tape cassettes, which are free from a deformation of magnetic tapes.

SUMMARY OF THE INVENTION

An aspect of the present invention lies in providing a case for accommodating a cassette with a magnetic tape, a shell, and reels, comprising:

a main body having therein a compartment with a bottom;

a support reference arranged with said main body on said bottom of said compartment, said support reference supporting the shell of the cassette to be apart from said bottom;

reel supports arranged with said main body on said bottom of said compartment, said reel supports supporting the reels of the cassette having the shell supported by the support reference to be in non-contact with the shell; and a lid arranged to close said compartment of said main body.

DETAILED DESCRIPTION OF THE INVENTION

Referring to the drawings wherein like reference numerals designate like parts throughout the views, a case for accommodating a tape cassette embodying the present invention will be described.

Figure 1:
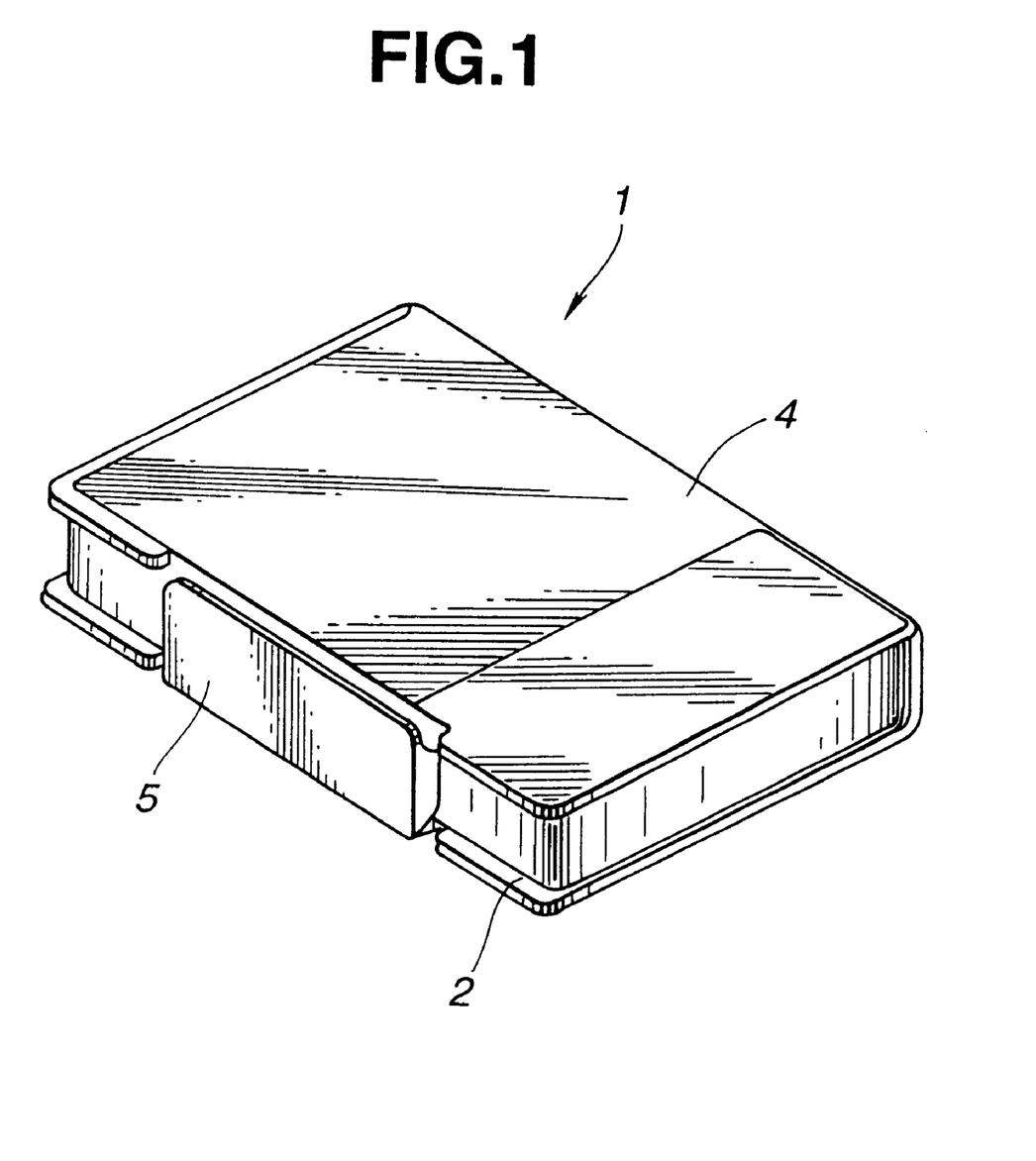
FIG. 1 is a perspective view showing a first embodiment of a case for accommodating a tape cassette, with a lid closed, according to the present invention.
Figure 2:
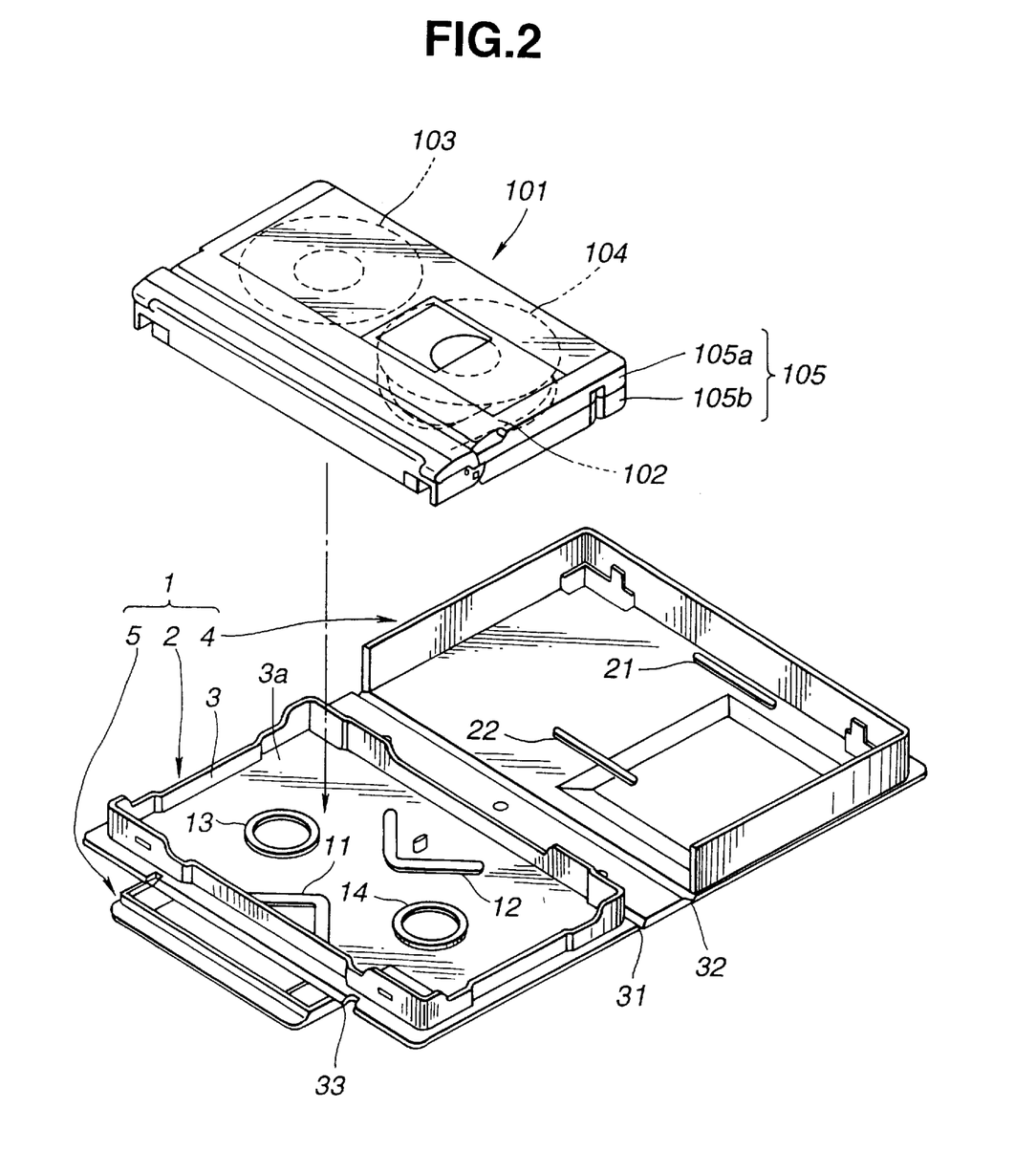
FIG. 2 is a view similar to FIG. 1, showing the case with the open.

FIGS. 1–5 show a first embodiment of the present invention. Referring to FIGS. 1-2, a case 1 for accommodating a tape cassette 101 comprises a main body 2, a lid 4 for closing a cassette compartment 3 arranged in the main body 2, and a side lock 5 for locking the lid 4 to the main body 2 in a way to close the cassette compartment 3.

Figure 3:
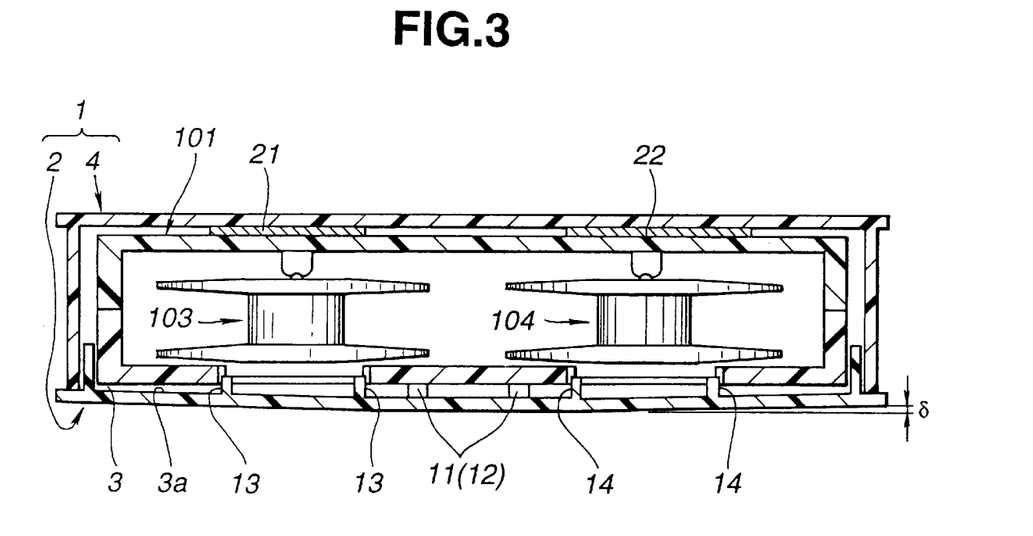
FIG. 3 if a longitudinal section showing the case with the tape cassette.

Referring also to FIG. 3, the case main body 2 includes on a bottom 3a of the cassette compartment 3 first and second cassette-support references 11, 12 for supporting a lower half 105b of a shell 105 of the tape cassette 101 as accommodated in a way to be apart from the bottom 3a of the cassette compartment 3, and a pair of reel supports 13, 14 for supporting in a way to be in non-contact with the lower half 105b of the shell 105 tape reels 103, 104 of the tape cassette 101 having the lower half 105b supported by the first and second reference cassette supports 11, 12.

As best seen in FIG. 2, the first and second cassette-support references 11, 12 include ribs arranged in the center of the bottom 3a of the cassette compartment 3 and having substantially V-shape as viewed in a plan view.

Figure 4:
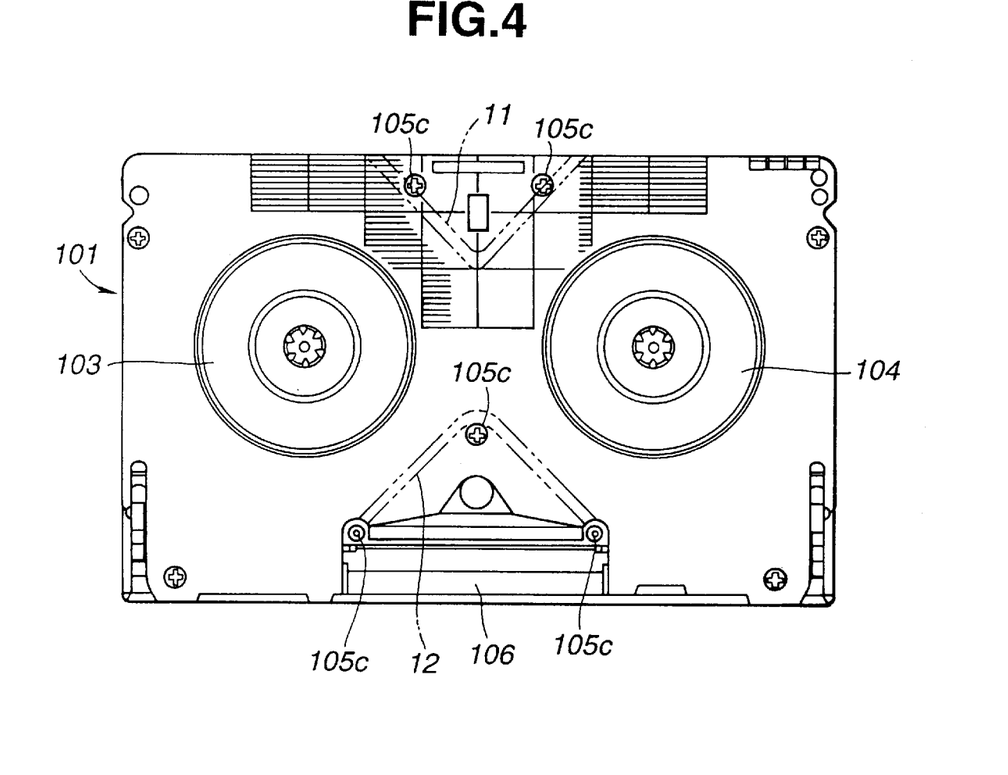
FIG. 4 is a plan view showing the positional relationship been the tape cassette and cassette-support references.

Referring also to FIG. 4, in order to avoid a deformation or bend of the tape cassette 101 by the pressure produced when pressing the tape cassette 101 on the first and second cassette-support references 11, 12 by first and second cassette-presser ribs 21, 22 arranged on the inside of the lid 4 and as will be described later, the first and second cassette-support references 11, 12 are arranged in the portions with relatively excellent mechanical strength such as the vicinity of the pocket 106 of the tape cassette 101 and the screwed portions of the upper and lower halves 105a, 105b of the shell 105.

Referring to FIG. 3, the first and second cassette-support references 11, 12 are greater in height than an amount δ of bend or deformation of the bottom 3a of the cassette compartment 3 of the case main body 2.

As seen in FIG. 2, the first and second reel supports 13, 14 are arranged both sides of a middle of the first and second cassette-support references 11, 12.

Figure 5:
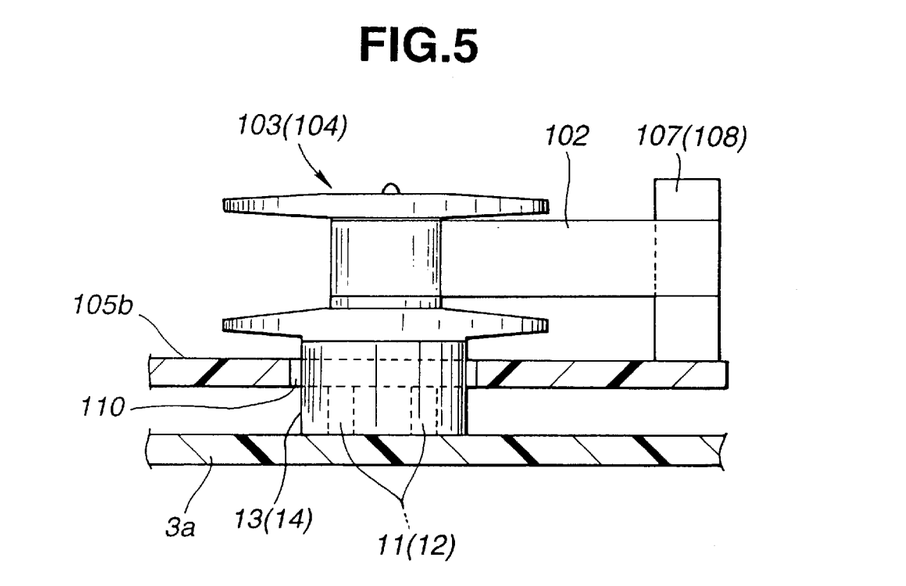
FIG. 5 is a fragmentary section showing a tape reel raised by a reel support.

Referring to FIG. 5, the first and second reel supports 13, 14 enter the shell 105 through reel-support openings 110 formed in the lower half 105b of the shell 105 of the tape cassette 101 accommodated in the cassette compartment 3 to raise the tape reels 103, 104.

The first and second reel supports 13, 14 are of height that the tape reels 103, 104 are so raised from the lower half 105b of the shell 105 that the magnetic tape 102 withdrawn from the tape reels 103, 104 and pressed on the tape guides 107, 108 is not inclined with respect to the lower half 105b as shown in FIG. 5.

Referring to FIG. 2, the lid 4, which is connected to one end of the case main body 2 through first and second thin hinges 31, 32, serves to close the cassette compartment 3 in a way to cover the case main body 2 through the hinges 31, 32 bent substantially at right angles.

The lid 4 includes on the inside the first and second cassette-presser ribs 21, 22 which are opposite to the first and second cassette-support references 11, 12, respectively, when placing the lid 4 on the case main body 2, i.e. in the closed state of the lid 4 as described above.

Referring to FIG. 2, the side lock 5, which is connected to another end of the case main body 2, i.e. an opposite end thereof with respect to the lid 4, through a third thin hinge 33, serves to lock the lid 4 placed on the case main body 2 through the hinge 33 bent substantially at right angles.

Next, the operation of the first embodiment will be described. When accommodating the tape cassette 101 in the cassette compartment 3 of the case main body 2, placing the lid 4 on the case main body 2, and locking the lid 4 to the case main body 2 by the side lock 5, the shell 105 of the tape cassette 101 has the upper half 105a pressed by the first and second cassette-presser ribs 21, 22 of the inside of the lid 4, thus having the lower half 105b pressed on the first and second cassette-support references 11, 12 of the bottom 3a of the cassette compartment 3. Moreover, the first and second reel supports 13, 14 enter the shell 105 through the reel-support openings 110 of the lower half 105b to raise the tape reels 103, 104 at a predetermined height.

Figure 6:
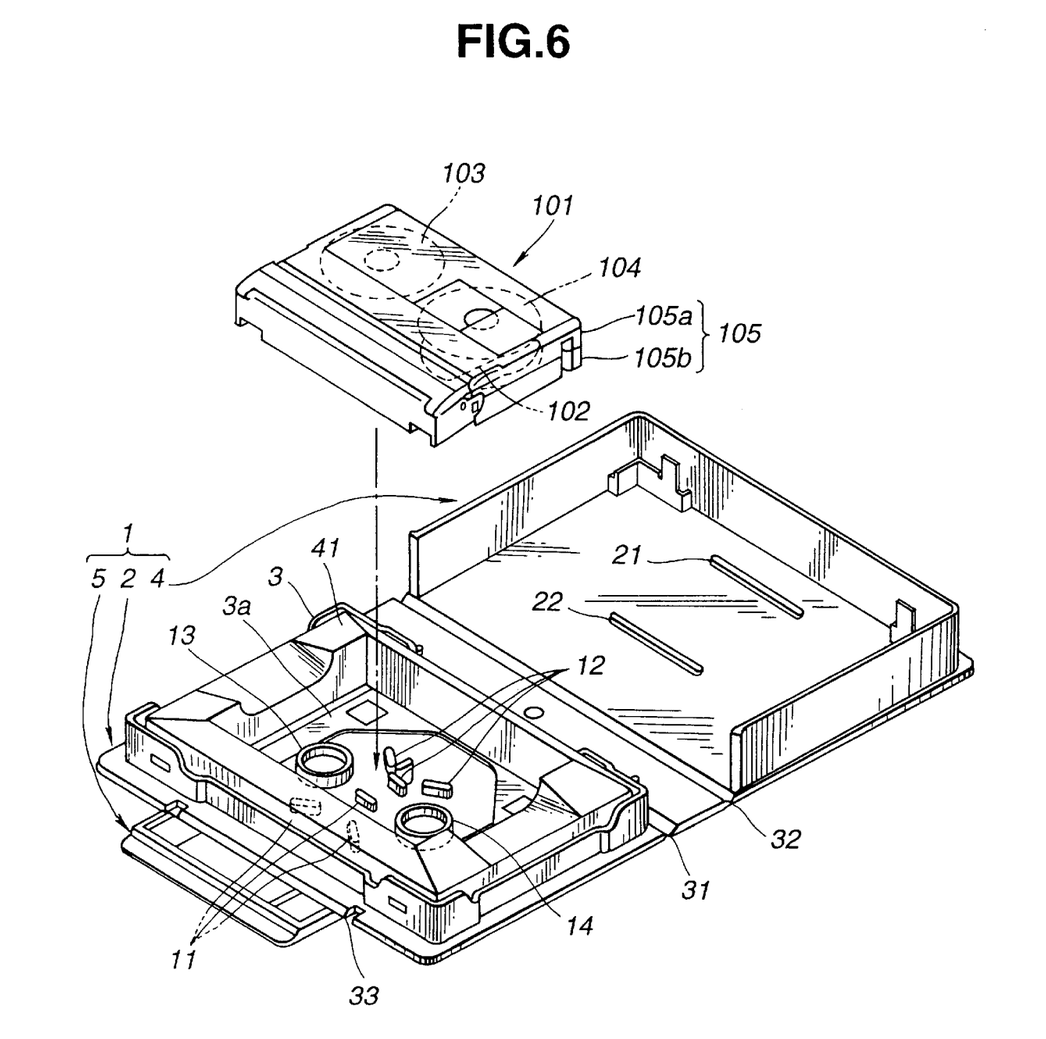
FIG. 6 is a view similar to FIG. 2, showing a second embodiment of the present invention.

FIG. 6 shows a second embodiment of the present invention which is substantially the same as the first embodiment except that the case 1 for accommodating the. tape cassette 101 includes a plastic frame 41 inside the case main body 2 to define the cassette compartment 3 in side the frame 41. The cassette compartment 3 serves to accommodate the tape cassette 101 smaller in size than the tape cassette 101 used in the first embodiment.

Having described the present invention in connection with the preferred embodiments, it is noted that the present invention is not limited thereto, and various changes and modifications can be made without departing from the scope of the present invention.

What is claimed is:

1. A case for accommodating a cassette with a magnetic tape, a shell, and reels, comprising:

a main body having therein a compartment with a bottom;

a support reference arranged with said main body on said bottom of said compartment, said support reference supporting the shell of the cassette to be apart from said bottom;

reel supports arranged with said main body on said bottom of said compartment, said reel supports supporting the reels of the cassette having the shell supported by the support reference to be in non-contact with the shell; and a lid arranged to close said compartment of said main body.

2. A case as claimed in claim 1, wherein said support reference is arranged in the center of said bottom of said compartment of said main body.

3. A case as claimed in claim 1, wherein said reel supports are arranged on both sides of said support reference.

4. A case as claimed in claim 2, wherein said support reference has a height greater than an amount of bend of said bottom of said compartment of said main body.

5. A case as claimed in claim 3, wherein said reel supports are of height that the reels of the cassette are so raised that the magnetic tape fails to be inclined with respect to the shell of the cassette.

6. A case as claimed in claim 1, wherein said lid includes ribs opposite to said support reference, said ribs pressing on said support reference the cassette accommodated in said compartment of said main body.

7. A case as claimed in claim 1, wherein said support reference includes a plurality of ribs.

8. A case as claimed in claim 7, wherein said plurality of ribs are V-shaped.

9. A case as claimed in claim 1, wherein said support reference includes a plurality of nubs.

10. A case as claimed in claim 9, wherein said plurality of nubs are arranged in two clusters, each cluster being generally V-shaped.

11. A case as claimed in claim 1, further comprising an inner frame for fitting inside said compartment of said main body and adapted to accommodate a cassette smaller in size than said compartment.

* * * * *